350-370 SR

XR 3,502,888

March 24, 1970 F. H. STITES 3,502,888

OPTICAL RETROREFLECTIVE LABEL READING SYSTEMS EMPLOYING POLARIZED ELECTROMAGNETIC RADIATION

Filed July 19, 1967 2 Sheets-Sheet 1

*INVENTOR.*
*FRANCIS H. STITES*

*BY* Peter Xiarhos

*AGENT.*

3502888
OR IN 350/566

INVENTORS.
FRANCIS H. STITES
BY Peter Xiarhos
AGENT.

3,502,888

OPTICAL RETROREFLECTIVE LABEL READING SYSTEMS EMPLOYING POLARIZED ELECTROMAGNETIC RADIATION

Francis H. Stites, Wayland, Mass., assignor to Sylvania Electric Products Inc., a corporation of Delaware
Filed July 19, 1967, Ser. No. 654,503
Int. Cl. G01n *21/30;* G02f *1/18*
U.S. Cl. 250—219 13 Claims

ABSTRACT OF THE DISCLOSURE

Optical label reading system for reading coded multiple-stripe retroreflective labels affixed to vehicles and for eliminating any adverse effects due to foreign matter which may be present on the labels. A coded retroreflective label on which foreign matter is present is scanned with plane-polarized light. The light reflected by the exposed retroreflective portions of the label is also a plane-polarized nature. However, the light reflected by the foreign matter is non-polarized. As the stripes of the label are successively scanned, the plane-polarized light retroreflected by the exposed portions of the retroreflective label and the non-polarized light returned by the foreign mater is returned to a light·converting means wherein the light received from each stripe of the label is converted into an electrical output representing only the plane-polarized light received from the stripe.

BACKGROUND OF THE INVENTION

The present invention relates to label reading systems, and more particularly, to optical label reading systems for reading coded multiple-stripe retroreflective labels.

Various systems and apparatus are known for optically reading coded labels affixed to vehicles or other objects presented to a label-reading station. An exemplary system for reading coded identification labels on railway vehicles is described in detail in United State Patent No. 3,225,177 to Sities et al., assigned to the assignee of the present application.

In the patented system, a label is constructed from a plurality of rectangular retroreflective orange, blue, and white stripes, and non-reflecting black stripes, and affixed in a vertical orientation to the side of a railway vehicle to be identified at a predetermined label reading location. The various stripes are arranged one above the other in a coded pattern representative of the identity of the vehicle or other information relating to the vehicle. As the labeled vehicle passes the label-reading location, the coded data is sensed from the label by means of an optical scanning apparatus which scans the label from bottom to top with an incident beam of light. The light reflected from the various retroreflective cdoe stripes of the label is returned along the path of the incident light and applied to suitable optical translation and decoding apparatus for further processing.

The above-described patented system has functioned satisfactorily to sense data from vehicle labels of the above type and to process such sensed data. However, it has been discovered that under certain adverse conditions, foreign matter such as dirt present on any portion of a coded retroreflective label may cause improper operation of the above-described vehicle identification system. More particularly, it has been discovered that when incident light from the optical scanning apparatus is directed into a label, portions of which are obscured from the incident light by the presence of foreign matter, the incident light may be returned to the optical scanning apparatus by the foreign matter and treated by the optical translation apparatus as a valid light input. Moreover, if sunlight strikes the foreign matter, the sunlight may also be returned to the optical scanning apparatus and similarly be treated as a valid light input. Accordingly, improper decoding may take place.

SUMMARY OF THE INVENTION

The present invention is directed to an optical label reading system which eliminates the above-described problems introduced by the presence of foreign matter on retroreflective labels.

Briefly, the label reading system of the present invention for reading a retroreflective label on which foreign matter may be present includes a means for scanning the label with polarized electromagnetic radiation. The polarized electromagnetic radiation strikes both the retroreflective portions of the label and any foreign matter present on the label. In the case of the retroreflective portions of the label, the electromagnetic radiation reflected therefrom is also of a polarized nature. However, in the case of the foreign matter, the elctromagnetic radiation returned therefrom is of a non-polarized nature. The polarized and non-polarized electromagnetic radiation derived from scanning the lable is returned to and received by a receiving means. The received polarized and non-polarized electromagnetic radiation is then applied to a converting means wherein the polarized and non-polarized electromagnetic radiation is converted into a signal representative of the polarized electromagnetic radiation only. In other words, the effects of the undesirable non-polarized electromagnetic radiation are eliminated.

DESCRIPTION OF THE PREFERRED EMBODIMENT

Figure 1:
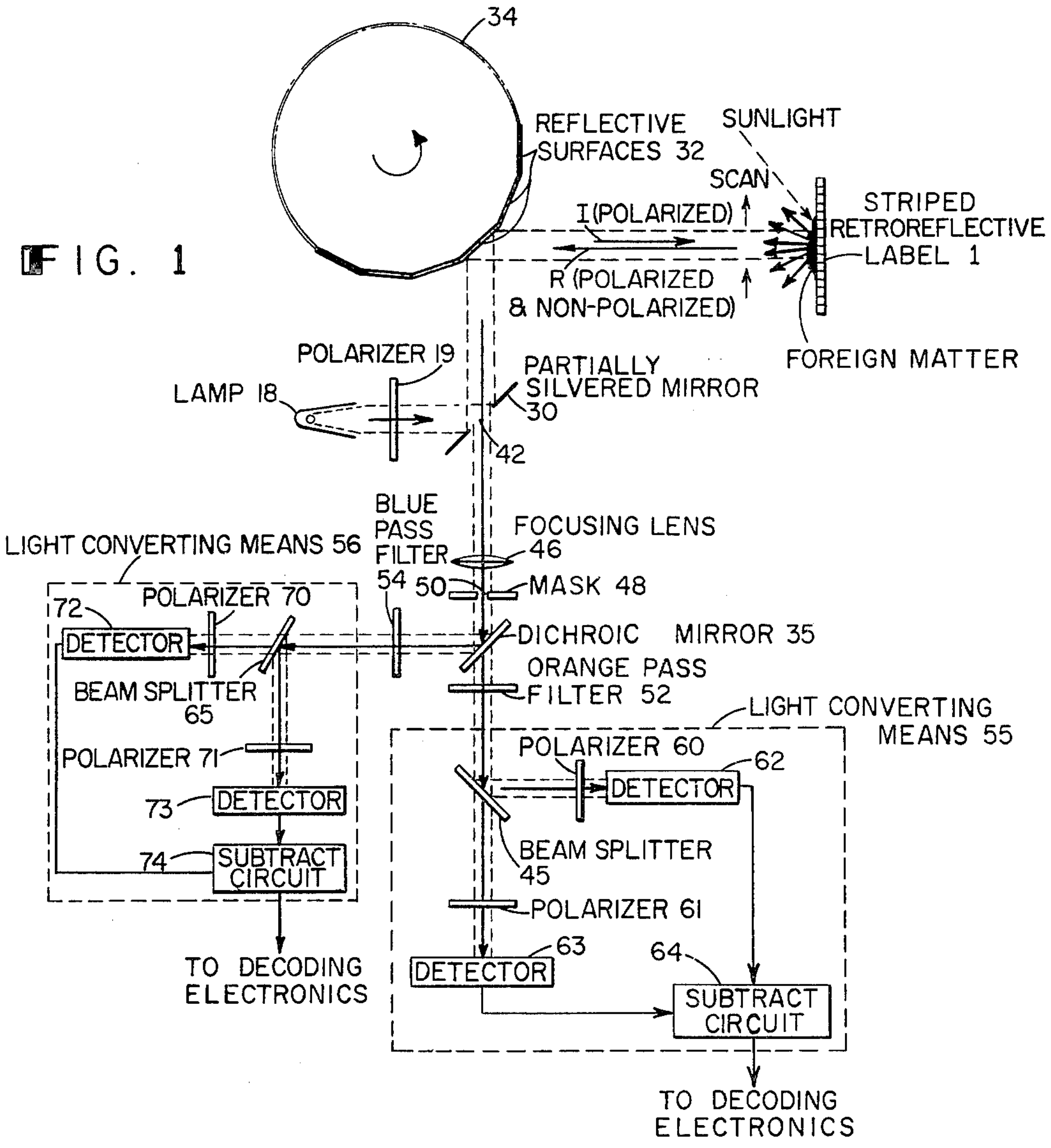
FIGURE 1 is a diagrammatic representation of an optical label reading system of the invention for reading multiple-stripe retroreflective coded labels on which foreign matter may be present.

Referring to FIGURE 1, there is shown a diagrammatic representation of the optical label reading system of the invention. As shown in FIGURE 1, the optical label reading system comprises: a rotating wheel 34 having a plurality of reflective surfaces 32 disposed on its periphery; a lamp 18; a polarizer 19; a partially-silvered mirror 30 provided with an elliptical aperture 42; a focussing lens 46; a mask 48 provided with a rectangular image viewing slot 50; a dichroic mirror 35; an orange pass filter 52; a blue pass filter 54; a first light converting means 55; and a second light converting means 56. The first light converting means 55 further includes a beam splitter 45, a pair of polarizers 60 and 61, a pair of detectors 62 and 63, and a subtract circuit 64. The second light converting means 56 further includes a beam splitter 65, a pair of polarizers 70 and 71, a pair of detectors 72 and 73, and a subtract circuit 74.

A coded label to be read by the apparatus of the optical label reading system of FIGURE 1 is indicated at 1 in FIGURE 1. Typically, the label 1 may comprise a plurality of rectangular retroreflective orange, blue, and white stripes, and non-reflective black stripes, arranged one above the other in a particular code combination. Labels of the above-described type are described in the above-cited patent to Stites et al. to which reference may be had for further details. Alternatively, the label 1 may comprise a plurality of rectangular retroreflective stripes of first and second widths, and of the same color, arranged in a code pattern. Typically, the single color retroreflective stripes are separated by non-retroreflective material.

Many other variations will be obvious to those skilled in the art. The operation of the label reading system of FIGURE 1 to read a coded retroreflective label comprising a combination of different colored stripes on which foreign matter is present will presently be described. The operation of the label reading system of FIGURE 1 and also an optical label reading system of FIGURE 2 for reading coded labels comprising stripes of a single color will also be described.

As an object, for example, a vehicle, bearing a coded retroreflective label 1 of the above-described type having orange, blue, white, and black stripes, is presented to the optical label reading system of FIGURE 1, the retroreflective label 1 is scanned with incident light originating from the lamp 18. The light emanating from the lamp 18, of a non-polarized nature, is directed onto and polarized by the polarizer 19, typically of a material known by the trade name "Polaroid." Alternatively, the polarizer 19 may be a multiple glass plate arrangement of a conventional construction. Although the present discussion will assume for purposes of discussion that the light from the polarizer 19 is polarized in a horizontal plane, it is to be understood that any other single plane may be selected. Alternatively, a polarizer which circularly polarizes light directed thereon may also be utilized.

The horizontal-plane polarized light output of the polarizer 19 is directed onto the partially-silvered mirror 30 and reflected therefrom onto the reflective surfaces 32 of the rotating wheel 34. As the rotating wheel 34 rotates, the plane-polarized light received by the reflective surfaces 32 is directed successively onto the stripes of the label 1. More particularly, the light directed onto the stripes of the label 1 takes the form of a scanning beam including light rays which traverse the stripes of the striped label 1 from bottom to top, a typical plane-polarized incident ray being indicated in FIGURE 1 at I.

The light returned from a given stripe of the label 1 upon being scanned depends on the nature of the stripe, that is, its color and its capability of retroreflecting incident light, and also on the nature of any foreign matter present on the stripe, that is, whether the foreign matter reflects or scatters light having the same or different wavelength than the wavelength of the color of the stripe under scan. For example, the foreign matter may be of such a nature as to scatter orange, blue, or white light, i.e., the colors of the retroreflective stripes of the label, or none of the above. In order to gain a clear understanding and appreciation of the invention, a discussion of the manner in which light is returned from a retroreflective orange stripe, a retroreflective blue stripe, a retroreflective white stripe, and a non-retroreflective black stripe on which foreign matter is present will now be presented. The operation of the optical label reading system of FIGURE 1 to process the light returned from each of the above stripes will also be described.

When a retroreflective orange stripe on which foreign matter is present is scanned by the optical scanning apparatus of FIGURE 1 with incident light rays polarized in a horizontal plane, the orange component of each incident light ray striking an uncovered portion of the retroreflective orange stripe is reflected back toward the reflective surfaces 32 along the same path as the incident ray without a change in the plane of polarization. Unlike the incident light rays striking the retroreflective portions of the orange stripe, the light rays striking the foreign matter present on the orange stripe are scattered by the foreign matter in a plurality of random planes; in other words, the light rays returned from the foreign matter are non-polarized. The plane-polarized light reflected from the retroreflective portion of the stripe constitutes the "signal" provided by the stripe; the non-polarized light returned from the foreign matter constitutes the "noise."

A portion of the non-polarized light (noise) scattered by the foreign matter is returned to the reflective surfaces 32 together with the plane-polarized light in a horizontal plane (signal) returned from the retroreflective portions of the orange stripe. In the event sunlight strikes the foreign matter in addition to the plane-polarized light from the system, a portion of the sunlight, also of a non-polarized nature (noise), is also returned to the reflective surfaces 32. Thus, the light returned from the retroreflective orange stripe under scan constitutes both the orange component of the plane-polarized light of the system and non-polarized light from the foreign matter. The total return light for a single stripe is indicated at R in FIGURE 1.

The light received by the reflective surfaces 32 is reflected by the surfaces 32 through the elliptical aperture 42 provided in the mirror 30. The aperture 42, because of the diagonal arrangement of the mirror 30, presents a circular transmission path for the combined plane-polarized and non-polarized light reflected from the retroreflective orange stripe and the foreign matter. The combined plane-polarized light and non-polarized light passing through the aperture 42 is focussed onto the mask 48 by the focussing lens 46. The reflected light projected onto the mask 48 as a result of scanning the partially-covered retroreflective orange stripe constitutes the image of the retroreflective orange stripe. The dimensions of the viewing slot 50 are selected such that the slot 50 examines only a portion of the entire width of the image of the stripe whereby only a portion of the light from the retroreflective orange stripe and foreign matter passes therethrough at a given time. The light passing through the slot 50 in the mask 48 is directed onto the dichroic mirror 35.

The dichroic mirror 35, of a conventional construction, serves to transmit orange light, polarized or non-polarized, through the orange pass filter 52 to the light converting means 55 and to reflect blue light, polarized or non-polarized, through the blue pass filter 54 to the light converting means 56. Thus, the orange plane-polarized light reflected from the retroreflective portions of the orange stripe as a result of scanning such stripe is transmitted to the light converting means 55. If the non-polarized light returned from the foreign matter is also orange or contains an orange component, such orange light or orange component also passes through the orange pass filter 52 to the light converting means 55.

It may be noted that in the event the non-polarized light returned from the foreign matter is blue or contains a blue component, such blue light or blue component passes through the blue pass filter 54 to the light converting means 56. It may also be that if the non-polarized light returned from the foreign matter is neither orange or blue or does not contain an orange or blue component of light, the dichroic mirror prevents passage of such light to either of the light converting means 55 and 56.

The orange light from the orange pass filter 52 is directed onto the beam splitter 45 and split in a conventional manner into two paths or channels. The light in one path is directed onto the polarizer 60, of the same type as the polarizer 19, while light in the other path is directed onto the polarizer 61, of a type like the polarizer 19 and the polarizer 61 but rotated through an angle of ninety degrees. That is, whereas the polarizers 19 and 16 are horizontal-plane polarizers, the polarizer 61 is a vertical-plane polarizer.

Thus, the light which passes through the polarizer 60 as a result of scanning the retroflective orange stripe is the orange light polarized in a horizontal plane and reflected from the uncovered portions of the orange stripe (signal) plus any orange non-polarized light (noise) in a horizontal plane returned from foreign matter present on the stripe. Since the polarizer 61 polarizes light in a vertical plane, the only light which passes therethrough is any orange non-polarized light (noise) which lies in a vertical plane. The magnitude of the non-polarized orange light (noise) in the vertical plane has a value substantially equal to the magnitude of the non-polarized orange light (noise) in the horizontal plane passing through the polarizer 60. It may be noted in the above example, that if the polarizer 19 is a circular polarizer, either of a "clockwise" or "counterclockwise" type, the polarizer 60 should be of the same type, that is, clockwise or counter-clockwise; the polarizer 61, therefore, should be of the counter-clockwise or clockwise type, respectively.

The orange light passing through each of the polarizers 60 and 61 is converted into an electrical representation by the detectors 62 and 63. Typically, the detectors 62 and 63 are photomultipliers. The electrical output signal of the detector 62, representative of the orange light polarized in a horizontal plane (signal) plus any orange non-polarized light in a horizontal plane (noise), is applied to one input of the subtract circuit 64. The electrical output signal of the detector 63, representative of any orange non-polarized light (noise) in a vertical plane, is applied to a second input of the subtracting circuit 64. The subtracting circuit 64, of a conventional construction, operates to subtract the electrical output signal of the detector 63 from the electrical output signal of the detector 62. Inasmuch as the electrical representations of the non-polarized light (noise) in the horizontal and vertical planes substantially cancel each other in the subtract circuit 64, the electrical output signal of the subtract circuit 64 represents the orange plane-polarized light (signal) only, and more particularly, the code information represented by the orange stripe.

It may be noted that if during the scan of the retroreflective orange stripe the foreign matter present on the retroreflective orange stripe returns non-polarized blue light or light including a blue component, that is, "noise," the non-polarized blue light or component of blue light is reflected onto the beam splitter 65 of the light converting means 56 and split into two paths by the beam splitter 65. The polarizer 70 acts to pass therethrough the non-polarized blue light in the horizontal plane; the polarizer 71 acts to pass therethrough the non-polarized blue light in the vertical plane. After the light outputs of the polarizers 70 and 71 are converted to electrical representations by the detectors 72 and 73, respectively, the output signals of the detectors 72 and 73 are substantially cancelled by the subtract circuit 74. Therefore, the non-polarized blue light (noise) is substantially eliminated by the light converting means 56 and no meaningful output signal is provided by the subtract circuit 74.

The operation of the optical label reading system of FIGURE 1 to scan a retroreflective blue stripe or a retroreflective white stripe on which foreign matter is present is essentially the same as described hereinabove in connection with the scan of a retroreflective orange stripe. In the case of a blue stripe, the light reflected by the uncovered retroreflective portions of the blue stripe, upon scanning the stripe, is blue light polarized in a horizontal plane (signal). Depending on the nature of the foreign matter, the non-polarized light (noise) returned by the foreign matter may also contain a blue component. The blue light returned from the blue stripe, polarized and non-polarized, is applied to the light converting means 56. In the light converting means 56, the non-polarized blue light (noise) in the vertical and horizontal planes is eliminated and an electrical output signal provided by the subtract circuit 74 representative of the plane-polarized blue light (signal) returned from the scanned retroreflective blue stripe, and more particularly, the code information represented by the blue stripe. If the foreign matter present on the retroreflective blue stripe returns any non-polarized orange light or light including an orange component (noise) as the blue stripe is scanned, the portions of such light lying in the vertical and horizontal plane are cancelled in the light converting means 55.

In the case of a white retroreflective stripe on which foreign matter is present, the light reflected therefrom constitutes plane-polarized white light (signal) from the uncovered retroreflective portions of the stripe and non-polarized light (noise) returned from the foreign matter. Inasmuch as the white plane-polarized light includes both an orange component and a blue component, such components are applied to the light converting means 55 and 56, respectively, together with any non-polarized orange and/or blue light (noise) returned by the foreign matter. In the same manner as previously described, output signals are produced by each of the subtract circuits 64 and 74. The presence of a signal on the output of each of the subtract circuits 64 and 74 is representative of the plane-polarized light (signal) from the white stripe, and more particularly, the code information represented by the white stripe. The undesirable orange and/or blue non-polarized light (noise) returned by the foreign matter present on the white stripe is eliminated in the light converting means 55 and 56.

The operation of the system of FIGURE 1 to scan a non-retroreflective black stripe on which foreign matter is present differs somewhat from the operations described hereinabove. In the case of a non-retroreflective black stripe, no part of the incident rays directed thereon in the scanning process is reflected therefrom inasmuch as such stripe has essentially no retroreflective characteristics. Therefore, the only light which is received from the black stripe as the black stripe is scanned is the non-polarized light (noise) returned from any foreign matter present on the stripe. Thus, if the foreign matter scatters non-polarized blue light or non-polarized orange light or non-polarized light having an orange component and a blue component (e.g., white light), such non-polarized light (noise) is substantially eliminated by the associated light converting means 55 and 56 in the manner described above. Therefore, no output signal is produced by either of the subtract circuits 64 and 74. The absence of an output signal from the subtract circuits 64 and 74 is accordingly representative of the fact that a black stripe has been scanned. The lack of output signal is also indicative of the code information represented by the black stripe.

Although the system of FIGURE 1 has been described for the scanning of coded labels having stripes of different colors, such system may also be employed for scanning coded labels comprising stripes of a single color. A typical label employing single color stripes may comprise a plurality of retroreflective stripes each of a first width or a second width and arranged in a suitable combination representative of coded information. The retroreflective stripes are usually separated by non-retroreflective material, for example, black paint. A common problem which is encountered in reading a coded label of the above-described type is that it is possible for certain types of foreign matter present on a non-retroreflective portion of the label to return light having the same color or wavelength as the light reflected from the retroreflective portions of the label. For example, if the retroreflective stripes are white and the foreign matter is white powder, the light returned from the foreign matter (noise) is also white. Accordingly, the white light returned by the foreign matter (noise) is treated in the same manner as white light (signal) reflected from a white stripe and improper operation of the decoding electronics results.

The above-described problem is eliminated by the label reading system of FIGURE 1. Thus, if all of the retroreflective stripes of a label are either orange, blue, or white, the retroreflective stripes in each case being of first and second widths and separated by non-retroreflective material, the label reading system of FIGURE 1 operates to read each stripe of the label in the manner described hereinabove. The only significant difference in operation is that the duration of the output signal of the subtract circuit 64 or the subtract circuit 74 corresponds to the width of the stripe under scan.

It may be noted that when the system of FIGURE 1 is utilized to read a label comprising orange stripes only, the blue channel is unnecessary and may be rendered inoperative; conversely, in reading a label comprising blue stripes only, the orange channel is unnecessary and may be rendered inoperative. If a label comprises white stripes only, either the orange channel or the blue channel is unnecessary and may be rendered inoperative inasmuch as the light reflected from a white stripe includes both orange and blue components.

Figure 2:
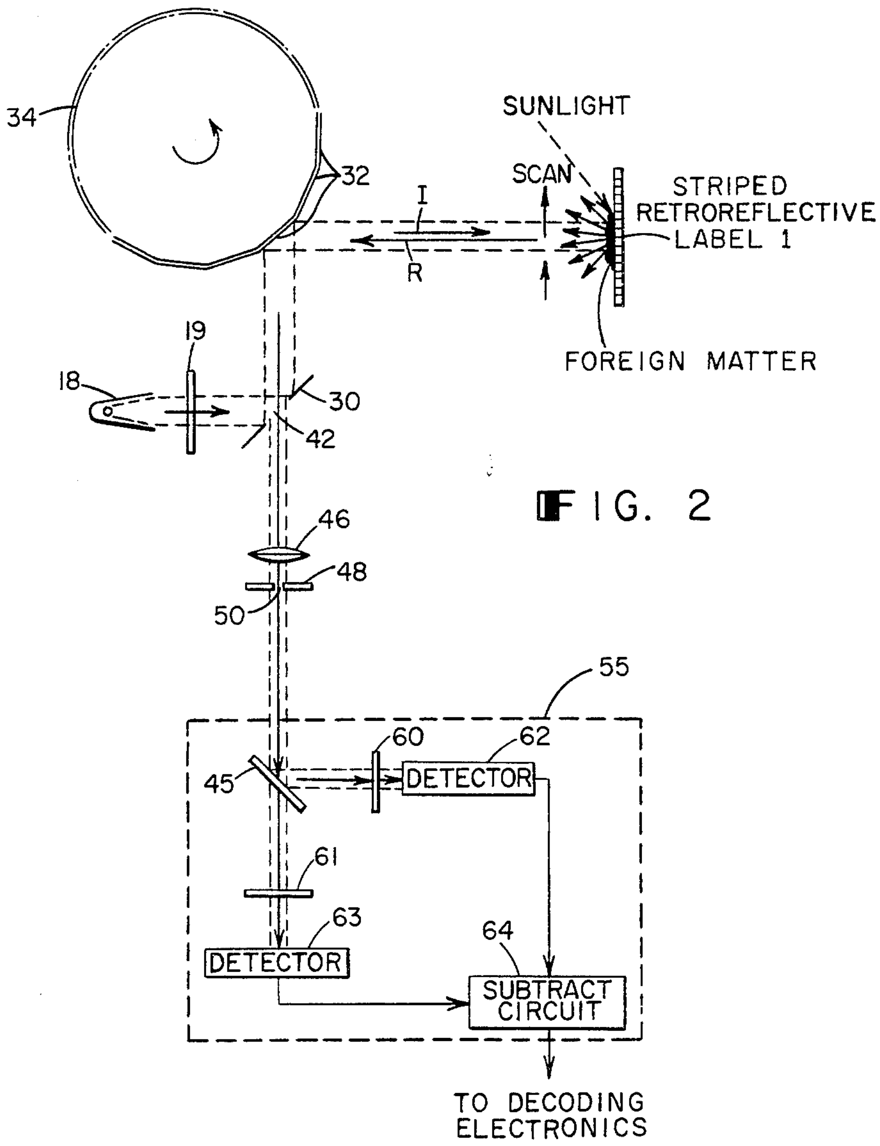
FIGURE 2 is a diagrammatic representation of a simplified arrangement of the optical label reading system of FIGURE 1 for reading coded retroreflective labels having stripes of a single color only.

The optical scanning apparatus of the label reading system of FIGURE 1 may be further simplified to read labels comprising stripes of any single color. The modified arrangement is shown in FIGURE 2. As is evident from FIGURE 2, the light converting means 56, the blue pass filter 54, the dichroic mirror 35, and the orange pass filter 52 present in FIGURE 1 have all been eliminated. In the further event a source of polarized light is used in lieu of the lamp 18, for example, a helium-neon gas laser adjusted to provide electromagnetic radiation in a predetermined plane or direction, the arrangement of FIGURE 2 may be further simplified by eliminating the polarizer 19 and the mask 48, inasmuch as the beam of the laser inherently accomplishes the functions of the polarizer 19 and the mask 48.

The operation of the label reading system of FIGURE 2 is essentially the same as that described hereinabove. Thus, if foreign matter is present on a retroreflective stripe under scan, the non-polarized light reflected from the foreign matter (noise), regardless of the color of the non-polarized light, is eliminated by the light converting means 55 of FIGURE 2. If foreign matter is present on a non-retroreflective portion of the label under scan, again the non-polarized light returned from the foreign matter (noise), regardless of the color, is eliminated by the light converting means 55.

It will now be apparent that novel label reading systems and apparatus for reading coded labels have been disclosed in such full, clear, concise, and exact terms so as to enable any person skilled in the art to which such systems and apparatus pertain to construct and use the same. It will also be apparent that various changes and modifications may be made in form and detail by those skilled in the art without departing from the spirit and scope of the invention.

What is claimed is:

1. In a system for reading a retroreflective label on which forign matter may be present, apparatus comprising:

means for scanning said retroreflective label with polarized electromagnetic radiation;

means adapted to receive non-polarized electromagnetic radiation returned by foreign matter present on the retroreflective label and polarized electromagnetic radiation reflected from the portions of the retroreflective label not covered by foreign matter; and converting means adapted to convert the received non-polarized and polarized electromagnetic radiation into a signal representative of the polarized electromagnetic radiation.

2. Apparatus in accordance with claim 1 wherein said converting means comprises:

first channel means adapted to provide a representation of the polarized electromagnetic radiation and a first portion of the non-polarized electromagnetic radiation;

second channel means adapted to provide a representation of a second portion of the non-polarized electromagnetic radiation of an amplitude substantially equal to the amplitude of said first portion; and subtract means for subtracting the representation provided by said second channel means from the representation provided by said first channel means whereby a signal is provided by said subtract means representative of the polarized electromagnetic radiation.

3. Apparatus in accordance with claim 2 wherein:

said first channel means includes (a) first polarizing means adapted to receive the non-polarized and polarized electromagnetic radiation and to pass therethrough the polarized electromagnetic radiation and a first portion of the non-polarized electromagnetic radiation having the same constitution as the polarized electromagnetic radiation; and (b) means adapted to operate on said polarized electromagnetic radiation and said first portion of the non-polarized electromagnetic radiation passing through said first polarizing means to provide an electrical signal representative thereof; and said second channel means includes:

(c) second polarizing means adapted to receive the non-polarized and polarized electromagnetic radiation and to pass therethrough a second portion of the non-polarized electromagnetic radiation having a constitution differing from the polarized electromagnetic radiation and an amplitude substantially equal to the amplitude of said first portion; and (d) means adapted to operate on said second portion of the non-polarized electromagnetic radiation passing through said second polarizing means to provide an electrical signal representative thereof.

4. Apparatus in accordance with claim 3 wherein said polarized electromagnetic radiation is polarized in a first direction, said first portion of said non-polarized electromagnetic radiation is in the same direction as said polarized electromagnetic radiation, and said second portion of said non-polarized electromagnetic radiation is in a direction opposite to the direction of said polarized electromagnetic radiation.

5. In a system for reading a label comprising a retroreflective stripe and a non-retroreflective stripe on which foreign matter may be present, apparatus comprising:

means for scanning said retroreflective stripe and said non-retroreflective stripe in succession with polarized electromagnetic radiation;

means adapted to receive non-polarized electromagnetic radiation returned by foreign matter present on the retroreflective stripe and on the non-retroreflective stripe and polarized electromagnetic radiation from the portions of the retroreflective stripe not covered by foreign matter; and converting means adapted to convert the non-polarized electromagnetic radiation returned from the foreign matter on the retroreflective stripe and polarized electromagnetic radiation received from the retroreflective stripe into a signal representative of the polarized electromagnetic radiation, and to eliminate the effect of the non-polarized electromagnetic radiation received from the foreign matter on the non-retroreflective stripe.

6. Apparatus in accordance with claim 5 wherein said converting means comprises:

first channel means adapted to provide a representation of the polarized electromagnetic radiation and a first portion of the non-polarized electromagnetic radiation received in response to said retroreflective stripe being scanned, and to provide a representation of a first portion of the non-polarized electromagnetic radiation received in response to said non-retroreflective stripe being scanned;

second channel means adapted to provide a representation of a second portion of the non-polarized electromagnetic radiation having substantially the same amplitude as the corresponding first portion received in response to said retroreflective stripe being scanned, and to provide a representation of a second portion of the non-polarized electromagnetic radiation of substantially the same amplitude as the corresponding first portion received in response to said non-retroreflective stripe being scanned; and subtract means adapted to subtract the representation provided by said second channel means from the representation provided by said first channel means resulting from the scan of said retroreflective stripe whereby an output signal is provided by said subtract means representative of the polarized electromagnetic radiation returned from said retroreflective stripe, and to subtract the representation provided by said second channel means from the representation provided by said first channel means resulting from the scan of said non-retroreflective stripe whereby essentially no output signal is provided by said subtract means.

7. Apparatus in accordance with claim 6 wherein:

said first channel means includes (a) first polarizing means operable in response to receiving the polarized electromagnetic radiation from the retroreflective stripe and the non-polarized electromagnetic radiation from foreign matter on the retroreflective stripe to pass therethrough the polarized electromagnetic radiation and a first portion of the non-polarized electromagnetic radiation having the same constitution as the polarized electromagnetic radiation, and in response to receiving the non-polarized electromagnetic radiation associated with foreign matter on the non-retroreflective stripe to pass therethrough a first portion of the non-polarized electromagnetic radiation having the same constitution as the polarized electromagnetic radiation; and (b) means adapted to operate on the electromagnetic radiation associated with each stripe passing through said first polarizing means to provide an electrical representation thereof; and said second channel means includes (c) second polarizing means operable in response to receiving the polarized electromagnetic radiation from the retroreflective stripe and the non-polarized electromagnetic radiation from foreign matter on the retroreflective stripe to pass therethrough a second portion of the non-polarized electromagnetic radiation having a constitution differing from the polarized electromagnetic radiation and an amplitude substantially equal to the amplitude of the corresponding first portion, and in response to receiving the non-polarized electromagnetic radiation from foreign matter on said non-retroreflective stripe to pass therethrough a second portion of the non-polarized electromagnetic radiation having a constitution differing from the polarized electromagnetic radiation and of an amplitude substantially equal to the corresponding first portion; and (d) means adapted to operate on the electromagnetic radiation associated with each stripe passing through said second polarizing means to provide an electrical representation thereof.

8. In a system for reading a retroreflective label on which foreign matter may be present, said label including a first stripe adapted to reflect electromagnetic radiation of a first wavelength and a second stripe adapted to reflect electromagnetic radiation of a second wavelength, apparatus comprising:

means for successively scanning said first and second stripes of said retroreflective label with polarized electromagnetic radiation;

means adapted to receive non-polarized electromagnetic radiation returned by foreign matter present on said label and polarized electromagnetic radiation of said first and second wavelengths reflected from the portions of said first stripe and said second stripe not covered by foreign matter;

first converting means adapted to convert non-polarized electromagnetic radiation of said first wavelength and polarized electromagnetic radiation of said first wavelength received upon scanning said first stripe into a representation of the polarized electromagnetic radiation of said first wavelength; and second converting means adapted to convert non-polarized electromagnetic radiation of said second wavelength and polarized electromagnetic radiation of said second wavelength into a representation of the polarized electromagnetic radiation of said second wavelength.

9. Apparatus in accordance with claim 8 wherein:

said first converting means comprises:

(a) first channel means adapted to provide a representation of the polarized electromagnetic radiation of the first wavelength and a first portion of the non-polarized electromagnetic radiation of the first wavelength;

(b) second channel means adapted to provide a representation of a second portion of the non-polarized electromagnetic radiation having the first wavelength and an amplitude substantially equal to the amplitude of said first portion; and (c) subtract means for subtracting the representation provided by said second channel means from the representation provided by said first channel means whereby a signal is provided by said subtract means representative of the polarized electromagnetic radiation of said first wavelength; and said second converting means comprises:

(a) first channel means adapted to provide a representation of the polarized electromagnetic radiation of the second wavelength and a first portion of the non-polarized electromagnetic radiation of the second wavelength;

(b) second channel means adapted to provide a representation of a second portion of the non-polarized electromagnetic radiation having the second wavelength and an amplitude substantially equal to the amplitude of said corresponding first portion; and (c) subtract means for subtracting the representation provided by said second channel means from the representation provided by said first channel means whereby a signal is provided by said subtract means representative of the polarized electromagnetic radiation of said second wavelength.

10. Apparatus in accordance with claim 9 wherein:

said first channel means of said first converting means includes:

(a) first polarizing means adapted to receive the polarized and non-polarized electromagnetic radiation of said first wavelength and to pass therethrough the polarized electromagnetic radiation and a first portion of the non-polarized electromagnetic radiation having the same constitution as the polarized electromagnetic radiation;

(b) means adapted to operate on said polarized electromagnetic radiation and said first portion of the non-polarized eelctromagnetic radiation of said first wavelength passing through said first polarizing means to provide an electrical signal representative thereof; and said second channel means of said first converting means includes:

(c) second polarizing means adapted to receive the polarized and non-polarized electromagnetic radiation of said first wavelength and to pass therethrough a second portion of the non-polarized electromagnetic radiation of said first wavelength having a constitution differing from the polarized electromagnetic radiation of said first wavelength and an amplitude substantially equal to the amplitude of said first portion; and (d) means adapted to operate on said second portion of the non-polarized electromagnetic radiation of said first wavelength passing through said second polarizing means to provide an electrical signal representative thereof;

said first channel means of said second converting means includes:

(e) first polarizing means adapted to receive the non-polarized and polarized electromagnetic radiation of said second wavelength and to pass therethrough the polarized electromagnetic radiation and a first portion of the non-polarized electromagnetic radiation having the same constitution as the polarized electromagnetic radiation;

(f) means adapted to operate on said non-polarized radiation and said first portion of the non-polarized electromagnetic radiation of said second wavelength passing through said first polarizing means to provide an electrical signal representative thereof;

said second channel means of said second converting means includes:

(g) second polarizing means adapted to receive the non-polarized and polarized electromagnetic radiation of said second wavelength and to pass therethrough a second portion of the non-polarized electromagnetic radiation of said second wavelength having a constitution differing from the polarized electromagnetic radiation of said second wavelength and of an amplitude substantially equal to the amplitude of said first portion; and (h) means adapted to operate on said second portion of the non-polarized electromagnetic radiation of said second wavelength passing through said second polarizing means to provide an electrical signal representative thereof.

11. In a system for reading a label on which foreign matter may be present, said label including a first retroreflective stripe adapted to reflect electromagnetic radiation of a first wavelength, a second retroreflective stripe adapted to reflect electromagnetic radiation of a second wavelength, a third retroreflective stripe adapted to reflect electromagnetic radiation of both said first and said second wavelengths, and a fourth non-retroreflective stripe adapted not to reflect electromagnetic radiation of either said first or second wavelengths, apparatus comprising:

means for scanning said first, second, third, and fourth stripes with polarized electromagnetic radiation;

means adapted to receive non-polarized electromagnetic radiation reflected by foreign matter present on said label and polarized electromagnetic radiation of said first and second wavelengths reflected from the portions of said first, second, and third stripes not covered by foreign matter;

first converting means adapted to convert non-polarized electromagnetic radiation and polarized electromagnetic radiation of said first wavelength received upon scanning said first and third stripes into representations of the polarized electromagnetic radiation of said first wavelength associated with said first and third stripes; and second converting means adapted to convert non-polarized electromagnetic radiation and polarized electromagnetic radiation of said second wavelength received upon scanning said second and third stripes into representations of the polarized electromagnetic radiation of said second wavelength associated with said second and third stripes;

said first and second converting means being further adapted to respectively eliminate non-polarized electromagnetic radiation of said first wavelength and of said second wavelength in response to scanning said non-retroreflective stripe.

12. Apparatus in accordance with claim 11 wherein: said first converting means comprises:

(a) first channel means adapted to provide individual representations of the polarized electromagnetic radiation of the first wavelength and a first portion of the non-polarized electromagnetic radiation of the first wavelength received in response to each of said first and third retroreflective stripes being scanned, and to provide a representation of a first portion of the non-polarized electromagnetic radiation of the first wavelength received in response to said non-retroreflective stripe being scanned;

(b) second channel means adapted to provide individual representations of a second portion of the non-polarized electromagnetic radiation of the first wavelength having substantially the same amplitude as the corresponding first portion received in response to each of said first and third retroreflective stripes and said non-retroreflective stripe being scanned; and (c) subtract means adapted to subtract the representation provided by said second channel means from the representation provided by said first channel means resulting from the scan of said first retroreflective stripe whereby a first output signal is provided by said subtract means representative of the polarized electromagnetic radiation of the first wavelength returned from said first retroreflective stripe, to subtract the representation provided by said second channel means from the representation provided by said first channel means resulting from the scan of said third retroreflective stripe whereby a second output signal is provided by said subtract means representative of the polarized electromagnetic radiation of the first wavelength returned from said third retroreflective stripe, and to subtract the representation provided by said second channel means from the representation provided by said first channel means resulting from the scan of said non-retroreflective stripe whereby essentially no output signal is provided by said subtract means; and said second converting means comprises:

(d) first channel means adapted to provide individual representations of the polarized electromagnetic radiation of the second wavelength and a first portion of the non-polarized electromagnetic radiation of the second wavelength received in response to each of said second and third retroreflective stripes being scanned, and to provide a representation of a first portion of the non-polarized electromagnetic radiation of the second wavelength received in response to said non-retroreflective stripe being scanned;

(e) second channel means adapted to provide individual representations of a second portion of the non-polarized electromagnetic radiation of the second wavelength having substantially the same amplitude as the corresponding first portion received in response to each of said second and third retroreflective stripes and said non-retroreflective stripe being scanned; and (f) subtract means adapted to subtract the representation provided by said second channel means from the representation provided by said first channel means resulting from the scan of said second retroreflective stripe whereby a first output signal is provided by said subtract means representative of the polarized electromagnetic radiation of the second wavelength returned from said second retroreflective stripe, to subtract the representation provided by said second channel means from the representation provided by said first channel means resulting from the scan of said third retroreflective stripe whereby a second output signal is provided by said subtract means representative of the polarized electromagnetic radiation of the second wavelength returned from said third retroreflective stripe, and to subtract the representation provided by said second channel means from the representation provided by said first channel means resulting from the scan of said non-retroreflective stripe whereby essentially no output signal is provided by said subtract means.

13. Apparatus in accordance with claim 12 wherein:

said first channel means of said first converting means includes:

(a) first polarizing means adapted to receive the polarized electromagnetic radiation of said first wavelength returned from said first and third retroflective stripes and the non-polarized electromagnetic radiation of said first wavelength returned from foreign matter on each stripe and to pass therethrough the polarized electromagnetic radiation and a first portion of the non-polarized electromagnetic radiation returned from the foreign matter on each stripe and having the same constitution as the polarized electromagnetic radiation; and (b) means adapted to operate on said electromagnetic radiation passing through said first polarizing means in response to scanning each stripe to provide electrical signals representative thereof; and said second channel means of said first converting means includes:

(c) second polarizing means adapted to receive the polarized electromagnetic radiation of said first wavelength returned from said first and third retroreflective stripes and the non-polarized electromagnetic radiation of said first wavelength returned from foreign matter on each stripe and to pass therethrough a second portion of the nonpolarized electromagnetic radiation returned from the foreign matter on each stripe having a constitution differing from the polarized electromagnetic radiation and an amplitude substantially equal to the amplitude of the corresponding first portion; and (d) means adapted to operate on said second portion of the non-polarized electromagnetic radiation of said first wavelength passing through said second polarizing means in response to scanning each stripe to provide electrical signals representative thereof; and said first channel means of said second converting means includes (e) first polarizing means adapted to receive the polarized electromagnetic radiation of said second wavelength returned from said second and third retroreflective stripes and the non-polarized electromagnetic radiation of said second wavelength returned from foreign matter present on each stripe and to pass therethrough the polarized electromagnetic radiation and a first portion of the non-polarized electromagnetic radiation returned from the foreign matter on each stripe and having the same constitution as the polarized electromagnetic radiation; and (f) means adapted to operate on said electromagnetic radiation passing through said first polarizing means in response to scanning each stripe to provide electrical signals representative thereof; and said second channel means of said second converting means includes (g) second polarizing means adapted to receive the polarized electromagnetic radiation of said second wavelength returned from said second and third retroreflective stripes and the non-polarized electromagnetic radiation of said second wavelength returned from foreign matter on each stripe and to pass therethrough a second portion of the non-polarized electromagnetic radiation returned from the foreign matter on each stripe having a constitution differing from the polarized electromagnetic radiation and an amplitude substantially equal to the amplitude of the corresponding first portion; and (h) means adapted to operate on said second portion of the non-polarized electromagnetic radiation of said second wavelength passing through said second polarizing means in response to scanning each stripe to provide electrical signals representative thereof.

References Cited

UNITED STATES PATENTS

| | | | |
|---|---|---|---|
| 3,197,647 | 7/1965 | Fraenkel | 250—225 |
| 3,405,990 | 10/1968 | Nothnagle et al. | 350—14 X |

OTHER REFERENCES

Barbar, "21 Ways to Pick Data Off Moving Objects," Control Engineering, October 1963, pp. 82–83.

RALPH G. NILSON, Primary Examiner

C. M. LEEDOM, Assistant Examiner

U.S. Cl. X.R.

250—225, 226; 350—15, 152; 356—118